(12) United States Patent
Lambert

(10) Patent No.: US 9,729,234 B2
(45) Date of Patent: Aug. 8, 2017

(54) FREE SPACE OPTICAL COMMUNICATIONS NETWORK WITH BENT PIPE CHANNEL AND PILOT CHANNEL

(71) Applicant: The Boeing Company, Chicago, IL (US)

(72) Inventor: Stephen G. Lambert, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 31 days.

(21) Appl. No.: 14/746,754

(22) Filed: Jun. 22, 2015

(65) Prior Publication Data

US 2016/0373188 A1 Dec. 22, 2016

(51) Int. Cl.
| | | |
|---|---|---|
| *H04B 10/112* | (2013.01) | |
| *H04L 12/24* | (2006.01) | |
| *H04Q 11/00* | (2006.01) | |

(52) U.S. Cl.
CPC ........ *H04B 10/112* (2013.01); *H04L 41/0813* (2013.01); *H04Q 11/0066* (2013.01); *H04Q 2011/0079* (2013.01)

(58) Field of Classification Search
CPC .................................................. H04B 10/112
See application file for complete search history.

(56) References Cited

U.S. PATENT DOCUMENTS

| 5,062,150 | A * | 10/1991 | Swanson ............. H04B 10/118 |
| | | | 250/203.1 |
| 5,918,157 | A | 6/1999 | Wiedeman et al. |
| 6,473,213 | B1 | 10/2002 | Wandernoth et al. |
| 6,535,314 | B1 * | 3/2003 | Mendenhall ......... H04B 10/118 |
| | | | 250/491.1 |
| 6,763,190 | B2 * | 7/2004 | Agrawal ............. H04J 14/0227 |
| | | | 370/216 |
| 6,839,520 | B1 | 1/2005 | Dreischer et al. |
| 7,110,717 | B2 | 9/2006 | Miller et al. |
| 8,385,223 | B2 | 2/2013 | Miller et al. |
| 2006/0024061 | A1 | 2/2006 | Wirth et al. |
| 2011/0305459 | A1 * | 12/2011 | Deore ................. H04B 10/0777 |
| | | | 398/139 |
| 2013/0315604 | A1 * | 11/2013 | LoPresti ............ H04B 10/1123 |
| | | | 398/116 |
| 2014/0016941 | A1 | 1/2014 | Coleman et al. |
| 2014/0270749 | A1 | 9/2014 | Miniscalco et al. |
| 2014/0294399 | A1 * | 10/2014 | Makowski ............. H04B 10/11 |
| | | | 398/126 |
| 2016/0165325 | A1 * | 6/2016 | Coleman .............. H04B 10/118 |
| | | | 398/45 |

OTHER PUBLICATIONS

Search Report for related European Application No. EP16165238.3; report dated Oct. 25, 2016.

* cited by examiner

*Primary Examiner* — Shi K Li
(74) *Attorney, Agent, or Firm* — Miller, Matthias & Hull LLP

(57) ABSTRACT

A method for a plurality of nodes in a free space optical communications network comprises using a bent pipe channel to relay data between at least some of the nodes of the network; and using a pilot channel for pointing, acquisition and tracking to continuously maintain line-of-sight between all of the nodes even when the bent pipe channel is not active.

21 Claims, 3 Drawing Sheets

FREE SPACE OPTICAL COMMUNICATIONS NETWORK WITH BENT PIPE CHANNEL AND PILOT CHANNEL

BACKGROUND

In a free space optical (FSO) communications network having a bent pipe architecture, data is transferred between relay nodes via optical space links. At each relay node, the data is re-amplified, but not modulated or demodulated.

On an optical link between a ground station and a relay satellite, outages can occur due to the physical nature of the atmosphere (e.g., cloud blockage, and clear air turbulence effects so severe that the optical link cannot function properly). An outage may be characterized by high bit errors or a total loss of data. In anticipation of a link outage at a single ground station, the network may be reconfigured by terminating an existing optical link and re-establishing a new optical link.

Recent reconfiguration approaches take time. Re-establishing a new optical link requires a spatial and signal acquisition that can take minutes to perform. As the reconfiguration is being performed, data is being buffered to prevent data loss. At a 100 Gbps data rate and a one minute switching time, six terabits of data must be buffered. The added latency from the buffering affects the network traffic and adds the potential for loss of data.

SUMMARY

According to an embodiment herein, a method for a plurality of nodes in a free space optical communications network comprises using a bent pipe channel to relay data between at least some of the nodes of the network; and using a pilot channel for pointing, acquisition and tracking to continuously maintain line-of-sight between all of the nodes even when the bent pipe channel is not active.

According to another embodiment herein, a method for a relay node in a free space optical communications network comprises using a first optical aperture to establish a first optical link with a near companion node in the network and a second optical aperture to establish a second optical link with a far companion node in the network. The method further comprises receiving a pilot-in signal and a bent pipe-in signal via the first optical link; using the pilot-in signal to control the first optical aperture for pointing, acquisition and tracking to continuously maintain optical line of sight with the near companion node; and optically re-amplifying the bent pipe-in signal, and sending the re-amplified signal to the far companion node via the second optical link.

According to another embodiment herein, a node for a free space optical communications network comprises a first terminal for establishing a first optical link with a near companion node in the network, and a second terminal for establishing a second optical link with a far companion node in the network. Each terminal includes an optical aperture, a power tap for bleeding a portion of a pilot-in signal received via the optical aperture, and an aperture control processor for using the portion for pointing, acquisition and tracking to continuously maintain optical line of sight with its companion node. Each terminal further includes optical circuitry for separating a bent pipe-in signal from the pilot-in signal and re-amplifying the bent pipe-in signal without modulating or demodulating the bent pipe-in signal.

These features and functions may be achieved independently in various embodiments or may be combined in other embodiments. Further details of the embodiments can be seen with reference to the following description and drawings.

DETAILED DESCRIPTION

Figure 1:
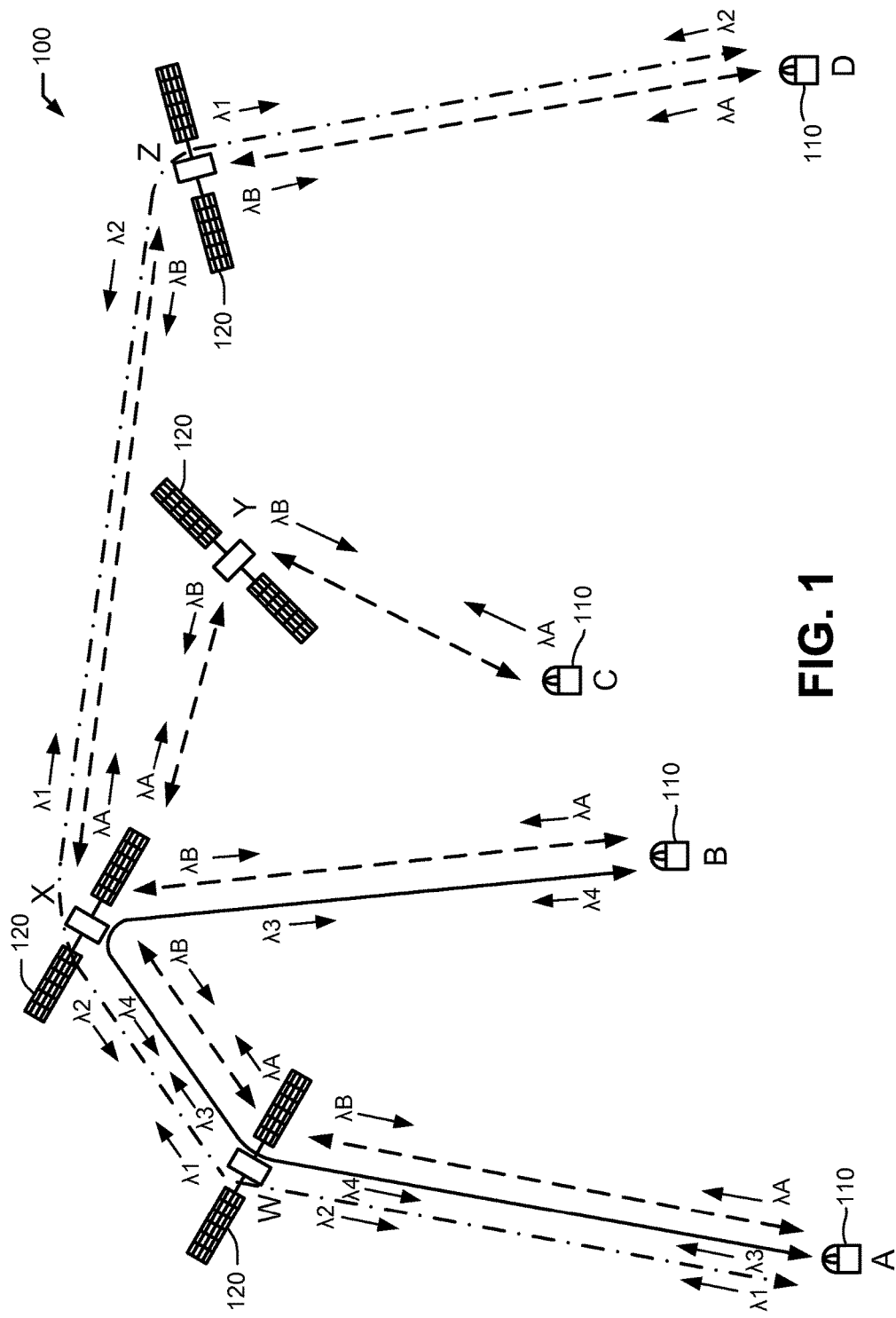
FIG. 1 is an illustration of a free space optical communications network and a method of reconfiguring the network.

Reference is made to FIG. 1, which illustrates a free space optical communications network 100 having a bent pipe architecture. The network 100 includes end nodes 110 and relay nodes 120. The end nodes 110 include ground stations, and the relay nodes 120 include relay satellites in Earth orbit. FIG. 1 shows four ground stations as end nodes 110, and four relay satellites as relay nodes 120 for illustrative purposes. However, the network 100 is not limited to those numbers.

The four ground stations are at locations A, B, C and D. The four relay satellites are at locations W, X, Y and Z. These locations may move if, for instance, the satellites are not geostationary or the ground stations are mobile.

Each node 110 and 120 may communicate with one or more other nodes 110 and 120 in the network 100 via laser communications (lasercom). Lasercom may be performed over one or more optical links.

The network 100 utilizes a bent pipe channel to relay data between nodes 110 and 120. An incoming signal is received by a relay node 120, re-amplified, and relayed to another node 110 or 120 (e.g., another relay satellite, or a ground station). The data on the bent pipe channel is not modulated or demodulated by any relay node 120. The bent pipe channel may or may not be active at any given time. For instance, there might be periods during which data is not sent.

Consider the end-to-end bent pipe channel 1 shown in solid. The channel 1 is formed by optical links between nodes at the following locations: A/W, W/X, X/Z and Z/D. The bent pipe channel 1 is bidirectional. It allows data to be relayed between the ground nodes at locations A and D in one direction at a first wavelength ($\lambda_1$) and in an opposite direction at a second wavelength ($\lambda_2$). The bent pipe channel 1 may also relay additional wavelengths in each direction.

The network 100 also utilizes a pilot channel to relay an optical pilot signal between nodes 110 and 120. The pilot channel has a clear line of sight (i.e. no clouds or physical blockages by the earth). The pilot channel is dedicated to pointing, acquisition and tracking (PAT). A pilot signal may be modulated/demodulated at each node 110 and 120. The pilot channel is used for pointing, acquisition and tracking to continuously maintain line-of-sight between all of the nodes 110 and 120 even when the bent pipe channel is not active.

The pilot channel is formed by optical links between pairs of nodes. These optical links cover all of the nodes 110 and 120 in the network 100. Consider the example of FIG. 1. The optical links are formed between the pairs of nodes at the following location: A/W, W/X, B/X, C/X, X/Y, X/Z, C/Y, and D/Z. Other optical links (e.g., Y/Z and W/Y) may be established if sufficient resources are available on the satellites (i.e., sufficient optical terminals) and the satellite line of sight is not blocked by the Earth.

A constellation manager (e.g., distributed command and control facilities) may use the pilot channel to communicate directly with each node 110 and 120 in the network 100. The communications may be direct (e.g., from the ground station at location B to the relay satellite at location X) or through a cross channel link (e.g., from the ground station at location B to the satellite at location Y).

The pilot channel may be bidirectional. Over each optical link, a first pilot signal is transmitted at a first wavelength ($\lambda_A$) in one direction, and a second pilot signal is transmitted at a second wavelength ($\lambda_B$) in an opposite direction. The two pilot signals may be placed on the same channel via wavelength-division multiplexing (WDM), frequency-division multiplexing (FDM), polarization or some other approach.

After a node 110 or 120 receives the pilot signal on the pilot channel optical link, the received pilot signal is demodulated and processed. Modulation formats include, but are not limited to, on-off keying (OOK), differential phase shift keying (DPSK), and pulse-position modulation (PPM). The processing includes using the pilot signal as an acquisition and tracking beacon for purposes of establishing and maintaining line of sight connectivity with the node 110 or 120 that sent the pilot signal. Spatial tracking may be performed on the received line of sight angles using a quadrant detector or other angle sensing technique.

The pilot channel is used to perform rapid reconfiguration of the network 100. Consider the example of an anticipated outage between the ground station at location D and the relay satellite at location Z. The outage may be anticipated according to gathered information (link conditions, etc.).

When the outage is anticipated, a new set of optical links for a new bent pipe channel 2 is identified based on available resources. As illustrated in FIG. 1, the ground stations at locations A and B are identified as end nodes 110, and the satellites at locations W and X are identified as relay nodes 120 in the new bent pipe channel 2. Once a command to switch to the new bent pipe channel 2 is initiated, the new bent pipe channel 2 comes alive automatically since the spatial acquisition is already established by the pilot channel. (The new set of optical links may be identified, and the command to switch may be initiated by a network manager or a network manager function residing external to the satellites.) Consequently, the reconfigured network 100 relays data over the new bent pipe channel 2 (shown in dot-dash), which is formed by optical links A/W, W/X and X/B.

The reconfiguration of the network 100 is rapid, since spatial reacquisition is not performed. Only a brief outage might occur (requiring a small buffer) to synchronize the data receiver clock at the receiving ground station. However, the amount of buffered data is substantially less than conventional reconfiguration. Latency is reduced, as is the chance of losing data.

The pilot channel may be used for purposes in addition to rapid reconfiguration. Data on the pilot channel may include telemetry and command data. The pilot channel may be used to transfer command and low rate telemetry between the relay nodes 120 and the end nodes 110.

Data on the pilot channel may include data concerning link health. The link health data may be used to monitor link conditions such as atmospheric and cloud effects, fading statistics, and signal strength.

The pilot channel may be used to transmit bent pipe channel status (e.g., average power received) to a mission manager or provide the data for use in end-to-end channel encoding and decoding.

The pilot channel may provide data for all of the relay nodes 120 in the network 100. The data for a particular satellite may be removed by the specific satellite needing it. If data is removed from the pilot channel, the remainder of the data is then remodulated and sent to the other satellites. In the alternative, the data is sent to all the satellites, and each satellite operates only on the data keyed for it. This alternative approach doesn't require remodulation, but it does take up more bandwidth.

Each relay node 120 may add data to the pilot channel. If data is added to the pilot signal, the pilot signal is remodulated and relayed.

The pilot channel may have a significantly lower data rate than the bent pipe channel. For instance, the data rate of the bent pipe channel may be 100 Gbps, whereas the pilot channel has a data rage of less than one Mbps.

The addition of the pilot channel may be realized with minimal weight penalty. A minimal amount of hardware is added. The additions include optical switching circuitry such as optical add/drop multiplexers and waveguides, a modem, and a processor. The pilot channel and bent pipe channel may share the same optical links. After the incoming optical signal is received, the optical switching circuitry separates the pilot signal from the bent pipe signal. The modem demodulates the pilot signal to produce an electrical pilot-in signal, and the processor processes the electrical pilot-in signal. If the processor adds or removes information from the pilot-in signal, the modem remodulates the electrical signal to produce an optical pilot-out signal, and the optical switching circuitry combines the pilot-out signal and the bent pipe signal.

Figure 2:
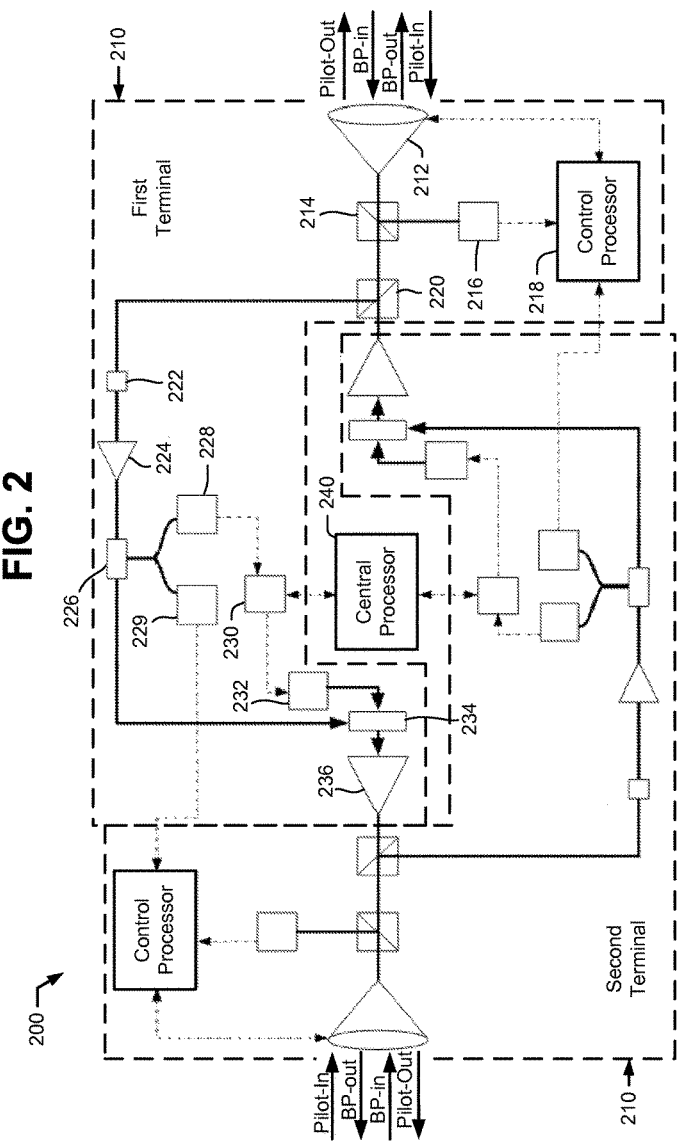
FIG. 2 is an illustration of an example of optical payload for a node in the free space optical communications network.

Reference is now made to FIG. 2, which illustrates an example of an optical payload 200 aboard a node 110 or 120 of the network 100. Bold solid lines represent optical paths, and dashed lines represent electrical signal paths. The node 110 or 120 carrying the optical payload 200 will be referred to as the local node.

The payload 200 of FIG. 2 includes first and second optical terminals 210. The first terminal 210 communicates with a near companion node, and the second terminal 210 communicates with a far companion node. The payload 200 may include additional terminals 210 and an N×N switch (not shown) for routing signals between the terminals 210.

In FIG. 2, the pilot channel and the bent-pipe channel of each terminal 210 are both shown as being active. That is, each terminal 210 receives an optical pilot-in signal and an optical bent pipe-in signal, and transmits an optical pilot-out signal and an optical bent pipe-out signal.

The first terminal 210 includes a gimbaled optical aperture 212 (e.g., a gimbaled telescope), an acquisition power tap 214, an acquisition angle detector 216, and a control processor 218. The acquisition power tap 214 bleeds a portion of the optical pilot-in signal and sends that portion to the acquisition angle detector 216, which spatially acquires the optical pilot-in signal. The acquisition angle detector 216 sends an electrical error signal to the control processor 218, which steers the optical aperture 212 to establish and maintain line of sight with the near companion node.

In the payload 200 of FIG. 2, the optical pilot-in signal serves functions in addition to PAT. The optical pilot-in signal also carries telemetry and command data.

In the first terminal 210, the optical bent pipe-in and pilot-in signals follow an optical path from the acquisition power tap 214, to a dichroic transmit/receive (Tx/Rx) beamsplitter 220, and then to a free-space to fiber coupler/nutator 222. The coupler/nutator 222 imparts a dither by spatial nutation on the optical pilot-in signal (and also the bent pipe-in signal). The bent pipe-in signal and the modulated pilot-in signal are amplified by a low noise optical amplifier 224 to establish a low noise receiver front-end for the pilot-in signal. The low noise amplification also boosts the pilot-in and bent pipe-in signal to levels that can be routed on the payload 200.

An optical demultiplexer 226 separates the bent pipe-in signal from the pilot-in signal. The optical demultiplexer 226 may be a wavelength demultiplexer, provided that the pilot signal wavelength is separated sufficiently in frequency from the bent-pipe wavelength so that no crosstalk occurs and no distortion is expected.

The optical pilot-in signal is split and sent to a pilot signal detector 228 and a receive pilot power detector 229. The receive pilot power detector 229 senses the dither on the pilot-in signal in quadrature to derive power on target. The power on target may be used to correct for misalignments (due to thermal drift, for example) between transmit line of sight (LOS) and receive LOS.

Consider the following example. The control processor 218 uses a control having a high frequency inner loop for beam steerers of the optical aperture 212 and a low frequency outer loop for gimbals of the optical aperture 212. The receive pilot power detector 229 senses the dither on the pilot-in signal in quadrature to measure an angular offset of the pilot-in signal to the receive LOS. If the pilot-in signal is not truly boresighted, this angle error is used to close the outer loop to keep correct for drift between the transmit LOS and the receive LOS. The drift correction may be performed when the pilot link is active.

The pilot signal detector 228 detects the optical pilot-in signal and sends an electrical pilot-in signal to a pilot modem 230. The pilot modem 230 demodulates the electrical pilot-in signal and produces an electrical signal that is sent to a central processor 240. The pilot-in signal may be interleaved and forward error encoded to aid in transmission through an atmospheric fading channel. The central processor 240 de-interleaves and decodes the signal to extract message content.

The central processor 240 may be configured to perform the following functions for each of the terminals 210: telemetry and command information transfer between satellites and ground stations in the network, channel quality/robustness measurements, channel fading statistic formulation, forward error correction and encoding, interleaving and de-interleaving, and PAT return channel power on target signaling.

The telemetry and command data is used during network reconfiguration to instruct one or more of the terminals 210 to establish an optical link with a different companion node. The telemetry and command data identifies the different companion node, and the central processor 240 commands the control processor 218 to establish the optical link. The central processor 240 and the control processor 218 may communicate over a command and telemetry bus (not shown).

Channel quality is inferred from signal strength and bit errors in modem. The channel quality may be added to the pilot-out signal as return telemetry. Fade statistics are inferred from sampling the signal strength. The fade statistics may also be added to the pilot-out signal as return telemetry.

The channel quality/robustness measurements, channel fading statistic formulation, and power on target signaling may be added to an electrical pilot-out signal. Command and telemetry data may also be added to the electrical pilot-out signal, except that data specific to the local node may be excluded.

The central processor 240 sends the electrical pilot-out signal to the pilot modem 230 for modulation. In the pilot modem 230, interleaving and forward error correction may be added to the pilot-out signal prior to modulation to aid in the mitigation of any potential channel fading effects on the pilot channel.

The signal from the pilot modem 230 drives a pilot laser 232, which produces an optical pilot-out signal. An optical multiplexer 234 combines the optical pilot-out signal with the optical output (the bent pipe-in signal) of the optical demultiplexer 226. An output of the optical multiplexer 234 is re-amplified by a high power optical amplifier 236.

The optical output of the high power optical amplifier 236 is sent to the dichroic Tx/Rx beamsplitter 220 of the second terminal 210. The re-amplified signal is passed through the Tx/Rx beamsplitter 220 and acquisition power tap 214 and then transmitted to the far companion node via the gimbaled optical aperture 212.

In each terminal 210, transmit-to-receive isolation is important so that the outgoing pilot signal doesn't interfere with the incoming pilot signal. The isolation may be achieved via wavelength separation, polarization, spatial separation (using separate transmit and receive apertures) and timing (blanking the transmitter when the receiver is listening) can be used.

The first and second terminals 210 utilize the same components, although the components may be configured differently with different sized apertures and different high power amplifiers. In addition, ground stations may have adaptive optics.

The optical payload 200 is not limited to two terminals 210. Different configurations of a ground node or satellite may have different numbers of terminals. However, all command and telemetry are processed and routed through the central command and telemetry processor.

Figure 3:
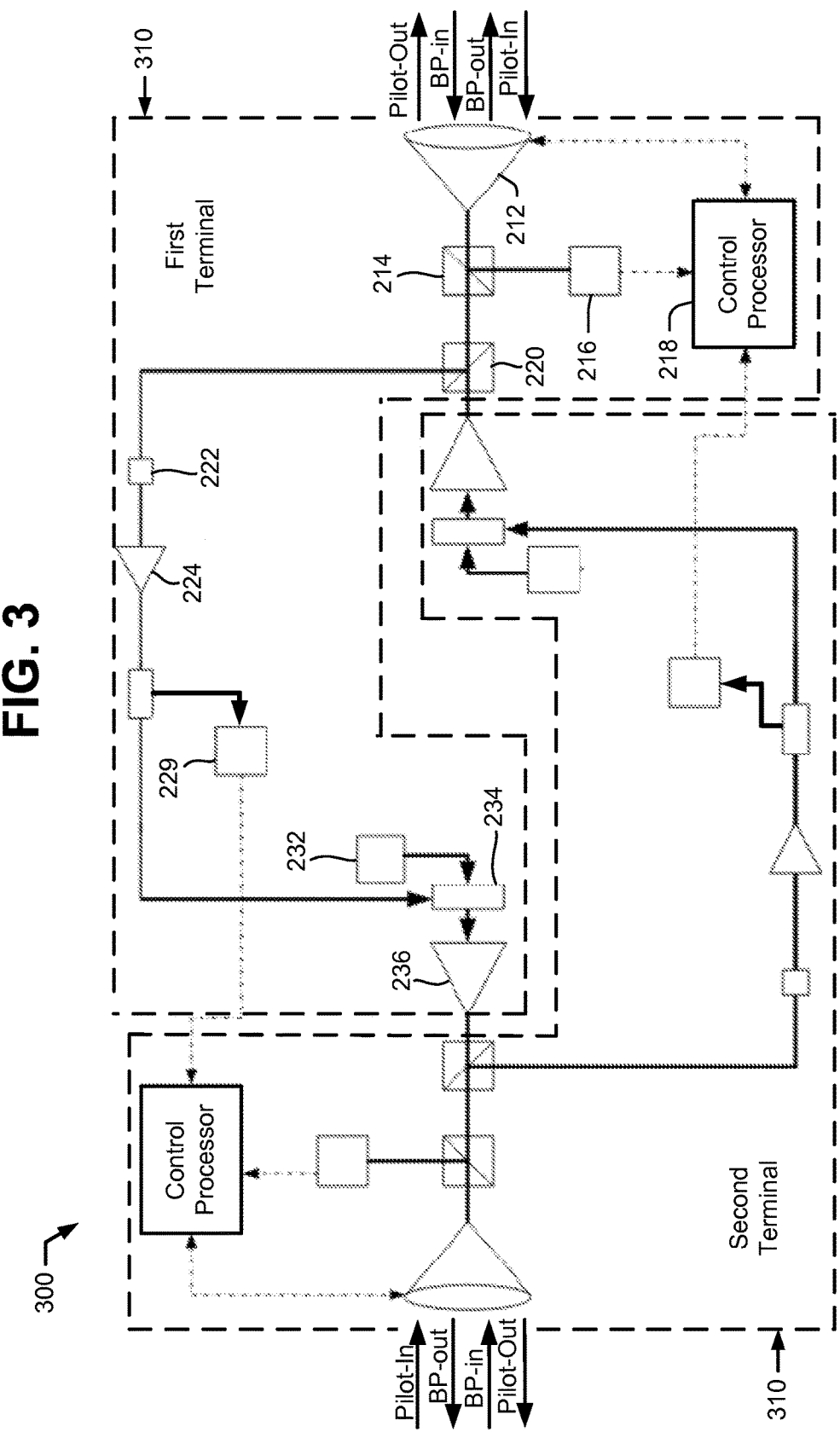
FIG. 3 is an illustration of another example of optical payload for a node in the free space optical communications network.

Reference is now made to FIG. 3, which illustrates a payload 300 in which the pilot-in signal is used solely for PAT. Each terminal 310 includes the same components as the terminal 210 of FIG. 2, except for the pilot signal detector 228 and the pilot modem 230.

A dichroic transmit/receive (Tx/Rx) beamsplitter 320 sends the optical signal to a high power optical amplifier 336 for re-amplification. An optical output of the high power optical amplifier 336 is sent to the dichroic transmit/receive (Tx/Rx) beamsplitter 320 of the second terminal 310.

In the payloads 200 and 300 of FIGS. 2 and 3, line of sight is continuously maintained with the near and far companion nodes even when the bent pipe channel is not active.

The invention claimed is:

1. A method for a plurality of nodes in a free space optical communications network, the method comprising:
    using a bent pipe channel to relay data between at least some of the nodes of the network; and
    using a pilot channel for pointing, acquisition and tracking to continuously maintain line-of-sight between all of the nodes even when the bent pipe channel is not active;

receiving, at a node of the of the free space optical communications network, an optical bent pipe-in signal on the bent pipe channel and an optical pipe-in signal on the pilot channel from a first companion node;

bleeding portion of the optical-in signal on the pilot channel to an aperture control processor for performing pointing, acquisition and tracking;

transmitting a remainder of the optical pilot-in signal with the optical bent pipe-in signal after bleeding the portion of the optical pilot-in signal;

separating the remainder of the optical pilot-in signal from the optical bent pipe-in signal;

processing the remainder of the optical pilot-in to produce an optical pilot-out signal;

combining the optical pilot-out signal with the optical bent pipe-in signal; and transmitting the combined optical pilot-out signal and optical bent pipe-in signal to a second companion node.

2. The method of claim 1, wherein the data that is relayed on the bent pipe channel is re-amplified but not modulated or demodulated.

3. The method of claim 1, wherein the pilot channel has a significantly lower data rate than the bent pipe channel.

4. The method of claim 1, further comprising reconfiguring the network, including:
using the pilot channel to identify a new set of optical links for a new bent pipe channel; and
switching to the new bent pipe channel;
whereby spatial acquisition for the new bent pipe channel is already established by the pilot-in signal on the pilot channel.

5. The method of claim 1, wherein for each node, a pilot-in signal on the pilot channel is used as a pointing, acquisition and tracking to continuously maintain a receive line of sight (LOS) with a near companion node.

6. The method of claim 5, wherein the pilot-in signal carries telemetry and command data, and a bent pipe-in signal carries the data on the bent pipe channel; and wherein the remainder of the pilot-in signal is demodulated after being optically separated from the bent pipe-in signal and demodulated; and wherein the telemetry and command data is processed.

7. The method of claim 6, further comprising at least one of adding data to the pilot-in signal channel and removing data from the pilot-in signal channel to produce an electrical pilot-out signal; and wherein the optical pilot-out signal is formed from the electrical pilot-out signal and combined with the optical bent pipe-in signal.

8. The method of claim 7, wherein at least one of link health data and bent pipe channel status is added to the electrical pilot-out signal channel.

9. The method of claim 5, further comprising adding a dither to the remainder of the optical pilot-in signal; deriving power on target from the dither, and using the power on target to correct for misalignment between transmit LOS and the receive LOS.

10. The method of claim 9, wherein the transmit LOS is controlled with a high frequency loop and a low frequency loop, and wherein the power on target is used to close the low frequency loop.

11. The method of claim 1, comprising re-amplifying the combined optical pilot-out signal and the optical bent pipe-in signal prior to transmitting the combined optical pilot-out signal and the optical bent pipe-in signal.

12. A method for a relay node in a free space optical communications network, the method comprising:

using a first optical aperture to establish a first optical link with a near companion node in the network and a second optical aperture to establish a second optical link with a far companion node in the network;

receiving a pilot-in signal and a bent pipe-in signal via the first optical link;

bleeding a portion of the optical pilot-in signal to control the first optical aperture for pointing, acquisition and tracking to continuously maintain optical line of sight with the near companion node;

transmitting a remainder of the optical pilot-in signal with the optical bent pipe-in signal after bleeding the portion of the optical pilot-in signal;

separating the remainder of the optical pilot-in signal to from the optical bent pipe-in signal at an optical demultiplexer of the relay node;

processing the remainder of the optical pilot-in signal at a central processor to produce an optical pilot-out signal;

combining the optical pilot-out signal with the optical bent pipe-in signal; and optically re-amplifying the combined optical pilot-out signal and optical bent pipe-in signal and sending the re-amplified signal to the far companion node via the second optical link.

13. A node for a free space optical communications network, the node comprising:
a first terminal for establishing a first optical link with a near companion node in the network;
a second terminal for establishing a second optical link with a far companion node in the network; and
a central processor that is shared by the first terminal and the second terminal;
wherein each terminal includes an optical aperture receiving an optical pilot-in signal and an optical bent pipe-in signal, a power tap for bleeding a portion of the optical pilot-in signal received via the optical aperture, and an aperture control processor for using the portion of the optical pilot-in signal for pointing, acquisition and tracking to continuously maintain optical line of sight with its companion node;
wherein each terminal further includes optical circuitry for transmitting a remainder of the optical pilot-in signal with the optical bent pipe-in signal bleeding the portion of the optical pilot-in signal, separating the optical bent pipe-in signal from the remainder of the pilot-in signal and re-amplifying the bent pipe-in signal without modulating or demodulating the bent pipe-in signal and demodulating the remainder of the optical pilot-in signal to produce an electrical pilot-in signal;
wherein the central processor processes the electrical pilot-in signal to produce an electrical pilot-out signal; and
wherein each terminal further include the optical circuitry for modulating the electrical pilot-out signal to produce an optical pilot-out signal and combining the optical pilot-out signal with the optical bent pipe-in signal for transmission by the optical aperture.

14. The node of claim 13, wherein the first terminal sends its re-amplified bent pipe-in signal and optical pilot-out signal to the second terminal for optical transmission to the far companion node; and wherein the second terminal sends its re-amplified bent pipe-in signal and optical pilot-out signal to the first terminal for optical transmission to the near companion node.

15. The node of claim 13, wherein each terminal further includes a modem for the demodulating the separated remainder of the optical pilot-in signal and sending the electrical pilot-in signal to the central processor.

16. The node of claim 15, wherein the electrical pilot-in signal carries telemetry and command data, and wherein the central processor is configured to process the command and telemetry data to perform network reconfiguration.

17. The node of claim 15, wherein the central processor is configured to modify the electrical pilot-in signal to add and/or remove data to produce the electrical pilot-out signal; and wherein each terminal includes: a modem for modulating the electrical pilot-out signal to produce the optical pilot-out signal.

18. The node of claim 17, wherein the central processor is configured to add at least one of link health data and bent pipe channel status to the electrical pilot-in signal to produce the electrical pilot-out signal.

19. The node of claim 17, wherein the central processor is configured to remove node-specific data from the electrical pilot-in signal to produce the electrical pilot-out signal.

20. The node of claim 13, wherein each terminal further includes an optical coupler/nutator for adding a dither to the remainder of the optical pilot-in signal prior to optical separation from the optical bent pipe-in signal; a receive pilot power detector for determining power on target; and wherein the aperture control processor uses the power on target to correct for misalignment between transmit and receive line of sight.

21. The node of claim 20, wherein the aperture control processor uses a control having a high frequency inner loop and a low frequency outer loop; and wherein the power on target is used to close the low frequency loop.

* * * * *

UNITED STATES PATENT AND TRADEMARK OFFICE
CERTIFICATE OF CORRECTION

PATENT NO. : 9,729,234 B2  Page 1 of 1
APPLICATION NO. : 14/746754
DATED : August 8, 2017
INVENTOR(S) : Stephen G. Lambert It is certified that error appears in the above-identified patent and that said Letters Patent is hereby corrected as shown below:

Column 7, Line 3, delete the word "pipe-in" and substitute therefore --pilot-in--.
Column 7, Line 5, add the word --a-- after the word "bleeding" and prior to the word "portion".
Column 7, Line 5, delete the word "optical-in" and substitute therefore --optical pilot-in--.
Column 7, Line 27, add --pilot-in signal on-- after the word "using".
Column 7, Line 33, delete the word "a" and substitute therefore --the--.
Column 7, Line 38, delete the word "a" and substitute therefore --the--.
Column 7, Line 63, add a space between "claim" and the number "1".
Column 8, Line 5, delete the first word "a" and substitute therefore --an optical--.
Column 8, Line 5, delete the second word "a" and substitute therefore --an optical--.
Column 8, Line 14, delete the word "to".
Column 8, Line 44, add the word --after-- before the word "bleeding".
Column 8, Line 47, add the word --optical-- before the word "pilot-in".
Column 8, Line 47, add the word --optical-- before the word "bent".
Column 8, Line 48, add the word --optical-- before the word "bent".
Column 8, Line 49, add a --,-- after the word "signal".
Column 8, Line 60, add the word --optical-- before the word "bent".
Column 8, Line 63, add the word --optical-- before the word "bent".
Column 8, Line 67, delete the first word "the".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*